United States Patent [19]

Barber, III et al.

[11] Patent Number: 5,438,840
[45] Date of Patent: Aug. 8, 1995

[54] FIELD HARVEST COOLING SYSTEM

[75] Inventors: Thomas A. Barber, III, Bethlehem; John Appolonia, Yardley, both of Pa.; William M. Kulik, Cranford, N.J.

[73] Assignee: The BOC Group Inc., New Providence, N.J.

[21] Appl. No.: 226,199

[22] Filed: Apr. 11, 1994

Related U.S. Application Data

[63] Continuation-in-part of Ser. No. 213,133, Mar. 14, 1994.

[51] Int. Cl.[6] .............................................. F25D 17/02
[52] U.S. Cl. ............................................. 62/64; 62/63; 62/374
[58] Field of Search ............................... 62/63, 64, 374

[56] References Cited

U.S. PATENT DOCUMENTS

| | | | |
|---|---|---|---|
| 3,232,067 | 2/1966 | Razum | 62/381 X |
| 3,296,818 | 1/1967 | Buxton | 62/64 X |
| 3,410,065 | 11/1968 | Martin | 62/64 X |
| 3,603,102 | 9/1971 | Banas | 62/64 |
| 3,831,389 | 8/1974 | Lipona | 62/63 |
| 4,414,823 | 11/1983 | McWhorter | 62/374 X |
| 4,434,623 | 3/1984 | Weasel, Jr. | 62/64 |
| 4,539,824 | 9/1985 | Kuraoka et al. | 62/374 X |
| 4,798,614 | 1/1989 | Aubry et al. | 62/374 |
| 4,866,950 | 9/1989 | Kiczek | 62/374 |
| 4,992,289 | 2/1991 | Kiczek | 62/64 X |

*Primary Examiner*—Christopher Kilner
*Attorney, Agent, or Firm*—David A. Draegert; R. Hain Swope; Larry R. Cassett

[57] ABSTRACT

Apparatus and process for cooling harvested edible and non-edible plants and plant products with a cryogenic fluid wherein the plants and plant products are delivered to an on-site freezer which receives the cryogenic fluid and the cooled plants and plant products and at least a portion of the cryogenic fluid is sent to a transportation vehicle.

23 Claims, 3 Drawing Sheets

FIELD HARVEST COOLING SYSTEM

RELATED APPLICATION

This is a continuation-in-part application of U.S. Ser. No. 08/213,133 filed on Mar. 14, 1994.

TECHNICAL FIELD

The present invention is directed to a field harvest cooling system which is used at field harvest sites to reduce the natural respiration and/or transpiration reaction of plants and plant products including foodstuffs, such as fruits and/or vegetables, and non-edible plants such as tobacco, to thereby reduce product spoilage.

BACKGROUND OF THE PRIOR ART

The present invention relates to a field harvest cooling system that cools the plants or plant products and maintains a blanket of chilled gas around the plants or plant products to slow degradation caused by respiration and/or transpiration. As used herein, the term "plants and plant products" is intended to cover all edible and non-edible plants that are eaten or used in their entirety (e.g. celery and tobacco, respectively) or where only a portion of the plant is eaten or used (e.g. tomatoes and seeds which produce edible or inedible oils). For the sake of brevity, all future reference herein will be made to plants. It should be understood, however, that the term "plants" also covers plant products whether edible or inedible.

Immediately following harvest in the field, plants such as fruits and vegetables, and non-edible plants such as tobacco begin the process of respiration. Respiration is generally expressed by the simplified process formula shown below.

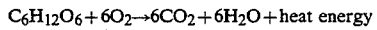

$$C_6H_{12}O_6 + 6O_2 \rightarrow 6CO_2 + 6H_2O + \text{heat energy}$$

In the respiration reaction a sugar, such as glucose or fructose, combines with oxygen to yield carbon dioxide, water and energy in the form of heat. The production of heat is principally responsible for the degradation of the harvested plants by (a) fueling the continuation of respiration and (b) triggering water loss (transpiration) which results in reduced product weight and diminished quality through over-ripening, fermentation and spoilage.

The heat energy produced during respiration is transferred to the plants resulting in an increase in temperature. For some plants, particularly those having a relatively high sugar content, respiration can result in spoilage within just four hours from the time of harvest.

In a typical harvesting operation, a harvester uses a picker or combine to remove the plants from the field or the plant products from the field plants. The picker/combine will have some limited integral storage area. When this storage device is filled, the picker/combine will unload the plants into a transport truck or bulk shipping container. When a truck is filled with plants or shipping containers containing the plants, the truck departs the field site for a final processing site or storage area.

Thus, significant time is lost from the moment of harvest until the transport truck departs the field site. Accordingly, the distance the transport truck may travel before the onset of spoilage is limited and determines how far from the field of harvest the plants may be processed.

In order to avoid excessive spoilage of harvested plants, it has been necessary to operate within the maximum allowable transport time measured from the field to the processing site and then to ensure that all plants delivered to the processing site are harvested within the maximum allowable transport time. One method of extending the maximum allowable transport time is to harvest when outside temperatures are relatively low such as during cool harvest seasons and/or early in the morning.

Harvesting under reduced temperature conditions to slow the respiration reaction can also be accomplished by treating the harvested plants with chilled water or ice. Such methods, however, are disadvantageous because they are costly, cumbersome and often times difficult to carry out because water and power sources may not be readily available in the field. In addition, there is a potential problem of waste-water disposal which may add to the cost of the harvesting operation.

It would therefore be a significant advance in the art of harvesting and transporting plants to a processing site if the harvested plants could be immediately and efficiently cooled and transported under reduced temperature conditions from the harvest site to the processing site.

SUMMARY OF THE INVENTION

The present invention is directed to a field harvest cooling system in which recently harvested plants are cooled to a temperature which reduces the rate of respiration and maintained at such temperatures while the plants are transported to the processing site. The term "cooling" as used herein shall mean that the temperature of the plant is reduced to a level necessary to lower the rate of respiration and including freezing the plants.

More specifically, the present field harvest cooling system comprises transportation means for transporting the harvested plants from a harvester to a cooling device. The cooling device, such as a freezer, comprises a cooled fluid supply means for providing a fluid capable of maintaining the cooling device at a temperature sufficient to reduce the rate of respiration and/or transpiration of the plants contained therein. In accordance with another aspect of the present invention, the cooled harvested plants along with at least a portion of the cooled fluid is sent to a storage means which can be a transportation vehicle for transporting the cooled plants to a processing site.

The present invention slows the respiration and/or transpiration process of the plants by attacking all aspects of the respiration/transpiration reactions including the chemical and thermal effects thereof. The plants are cooled thereby reducing the generation of heat. Oxygen, one of the key elements necessary for the onset of respiration, is displaced by the cooled fluid in both the cooling device and the storage means. If carbon dioxide is used as the cooling fluid, supersaturating the atmosphere around the plants shifts the respiration reaction equilibrium and thereby slows the respiration process. Slowing the respiration/transpiration process allows greater flexibility in the transportation and handling of the harvested plants with reduced risk of product spoilage.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

Figure 1:
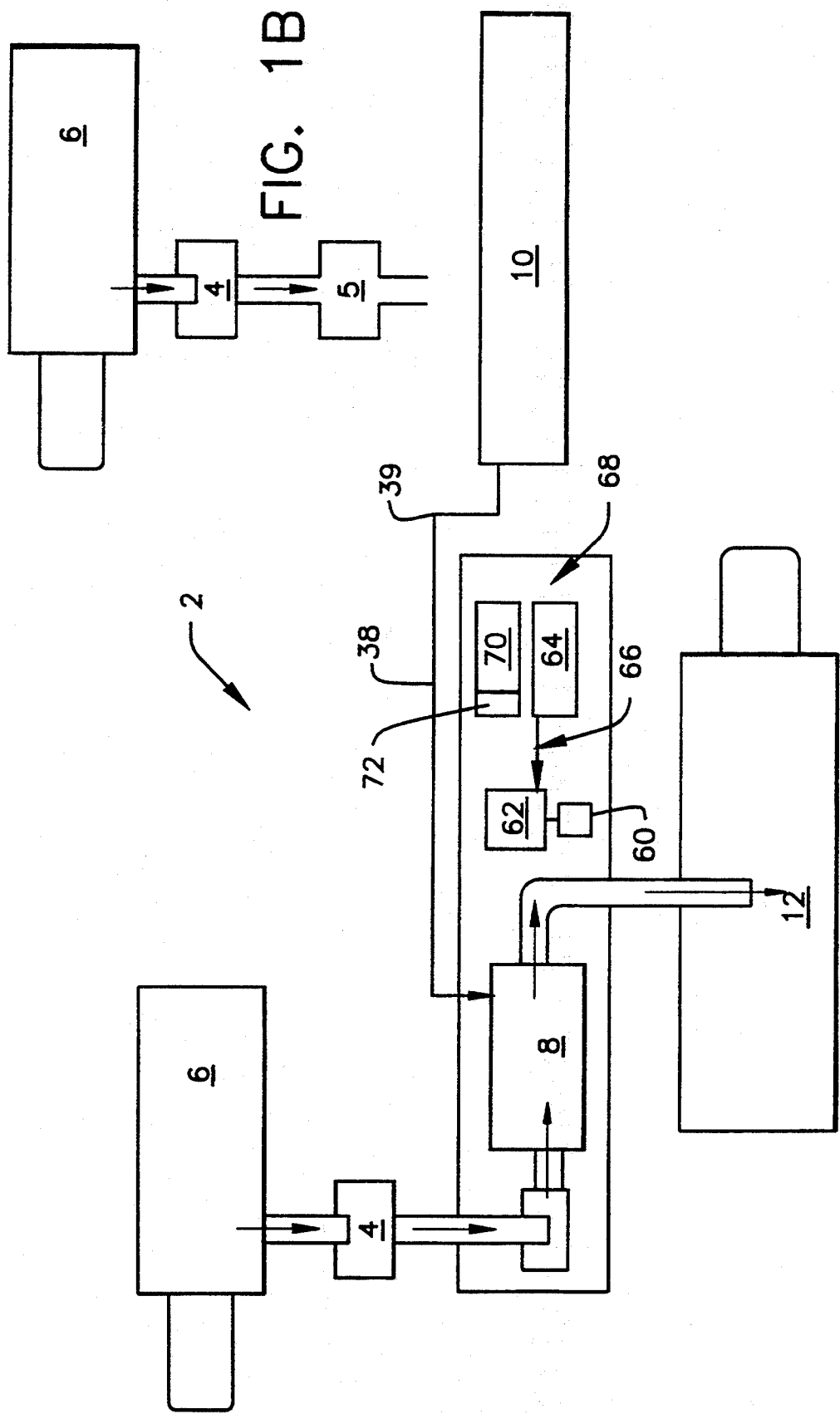
FIG. 1A is a schematic plan view of an embodiment of the field harvest cooling system of the present invention.
FIG. 1B is a partial schematic plan view of another embodiment of the invention similar to FIG. 1A in which a device is provided to remove moisture from the harvested plants before cooling.
Figure 2:
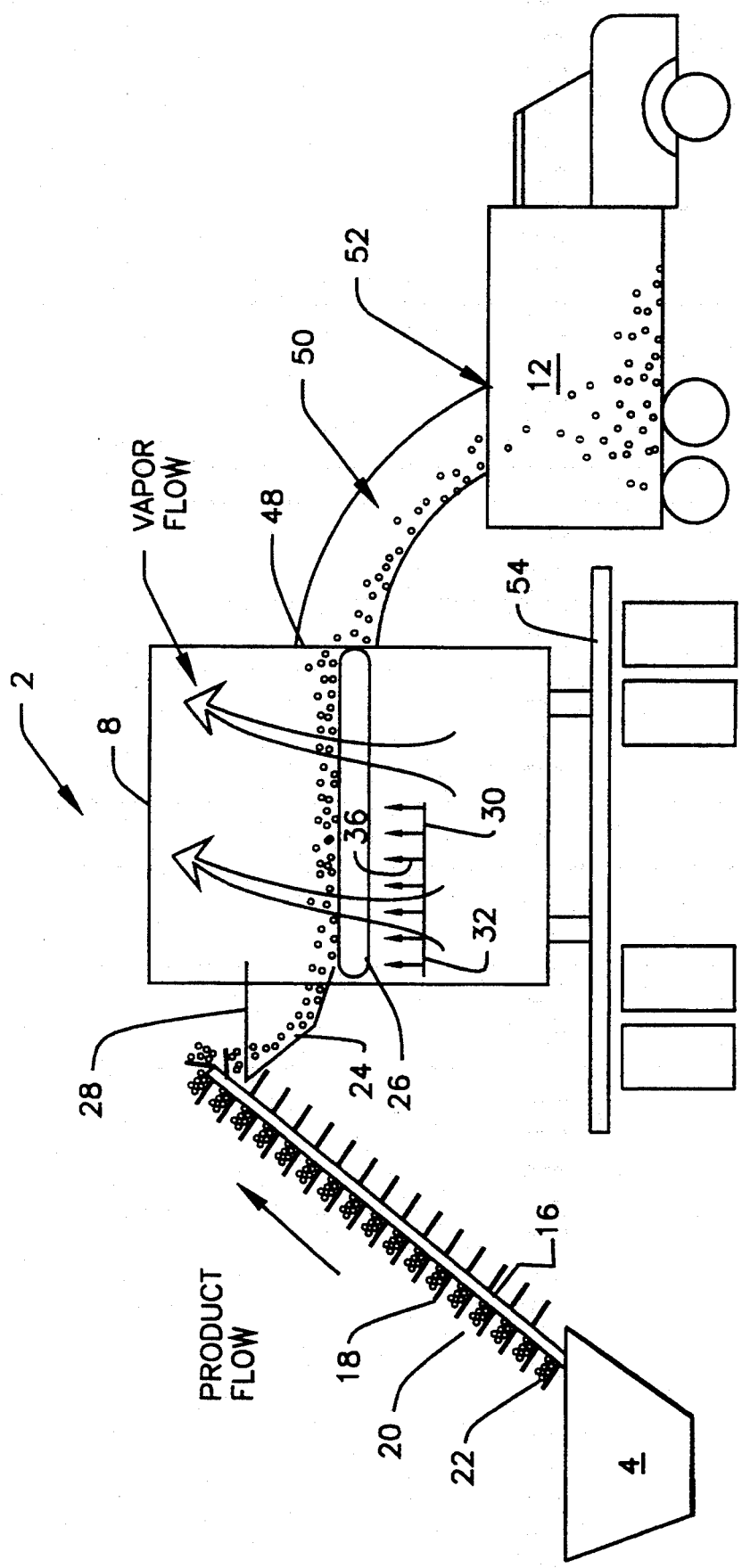
FIG. 2 is a perspective view showing a side elevation of an embodiment of the field harvest cooling system of the present invention.

Referring to the drawings and particularly to FIGS. 1A, 1B and 2 there is shown a field harvest cooling system 2 including a hopper-conveyor 4 for collecting edible or non-edible plants or plant products, hereinafter collectively referred to as plants, from a harvester 6 and for transporting the harvested plants to a cooling device 8 such as a fluidized bed freezer. As shown specifically in Figure 1B, there may be provided an optional moisture removing device 5 as explained in detail hereinafter.

The freezer 8 is supplied with a cooling fluid such as a liquid cryogen from a source 10. The cooled plants and at least a portion of the cooled fluid is conveyed to a storage vessel 12, such as a transportation vehicle which can then deliver the cooled plants to a processing site.

The harvested plants for processing in the cooling system 2 of the present invention is obtained from a harvester 6 such as a Chisolm-Ryder (Niagara Falls, N.Y.) combine having an integral storage capacity of about 2,000 pounds. The combine 6 is adapted to unload the harvested plants into a hopper-conveyor 4 which includes a plant receiving bin 14 and a belt conveyor 16 such as a MacMaster-Carr Hopper Belt Conveyor (Model No. 5780K63) as shown best in FIG. 2. This particular conveyor has a maximum rated conveying capacity of 7,500 pounds per minute at 300 feet per minute. Accordingly, about 350 pounds of plants per minute can be transported to the freezer 8 at a belt speed of 15 to 20 feet per minute.

It may be desirable to remove at least a portion of the moisture contained within a harvested plant. Moisture removal is preferably performed when desirable before the plant is sent to the cooling device 8. As shown in FIG. 1B, the cooling system 2 may be provided with a moisture removing device 5 designed to remove moisture without damaging the harvested plant. Removal of moisture may be desirable, for example, to minimize the weight of the plants to reduce transportation costs.

The device 5 may remove moisture by heat, evaporation, mechanical means and the like. For example, the device 5 may include a heater to remove moisture by thermal means. Separately or together with a heater, the device 5 may include a vessel with or without air circulation means allowing natural evaporation of moisture to take place. Alternatively, the device 5 may include rollers and/or presses to mechanically remove moisture from the plants. The latter type of device is preferred for removing moisture from non-edible plants such as tobacco.

Referring specifically to FIG. 2 the harvested plants with or without optional moisture removal treatment, is sent to the freezer 8 by a conveyor 16. The belt conveyor 16 includes spaced apart partitions 18 which form regions 20 for transporting the harvested plants 22 out of the bin 14 toward the freezer 8. The plants 22 contained within the regions 20 are unloaded into a chute 24 and onto a conveyor belt 26 associated with the freezer 8. The plants are carried by the conveyer belt 26 through an opening 28 into the freezer 8.

As shown in FIG. 2, when the plants enter the freezer 8 they are met with an upward rush of cold vapor (shown by the pair of large arrows). The cold vapor is provided by, for example, a cryogen injection device 30 which includes a nozzle 32 comprised of a tube 34 having at least one, preferably a plurality of spaced apart openings 36. A cryogenic fluid such as liquid nitrogen or carbon dioxide from a source 10 is directed in a controlled manner as hereinafter described through a conduit 38 (see FIG. 1A) in the form of insulated piping via an optional flexible hose 39 to the nozzle 32. The cryogenic fluid is released from the nozzle 32 (shown by the small arrows) and the cold vapor rises and cools the plants which pass along the conveyor belt 26. In a preferred form of the invention, the cryogenic fluid is released through the nozzle 32. The injected cryogenic fluid together with the recirculated vapor is at a velocity sufficient to support the weight of the plants on the conveyor belt 26 and to effect rapid heat transfer.

The temperature of the freezer 8, through the introduction of the cryogenic fluid should be maintained at a temperature sufficient to control within desirable limits respiration and/or transpiration of the plants. In some cases, it may be desirable to freeze the plants during the cooling process such as in the treatment of non-edible plants like tobacco.

The temperature of the freezer 8 for most applications will be in the range of from about 10° F. to −250° F. When cooling the plants at a temperature above their freezing point, the preferred temperature range is from about 10° F. to −80° F., most preferably about −45° F. When freezing of the plants is desired, a preferred temperature is in the range of from about −20° F. to −250° F., with about −90° F. being most preferred.

It should be understood that freezing is partly dependent on the residence time of the plants within the freezer 8. The longer the residence time, the higher the temperature may be to freeze the harvested plants. Accordingly, freezing may take place within the temperature range of 10° F. to −250° F. by adjusting the speed of the conveyor 26 so as to provide an appropriate residence time for the plants within the freezer 8. It should be further noted that the selection of a suitable temperature for the freezer 8 depends on the type of plants to be cooled and is well within the skill of the art.

The rate of injection of the cryogenic fluid is dependent on the temperature desired in the freezer 8. Control of the rate of cryogen injection is accomplished, for example, by a temperature control system 40.

Figure 3:
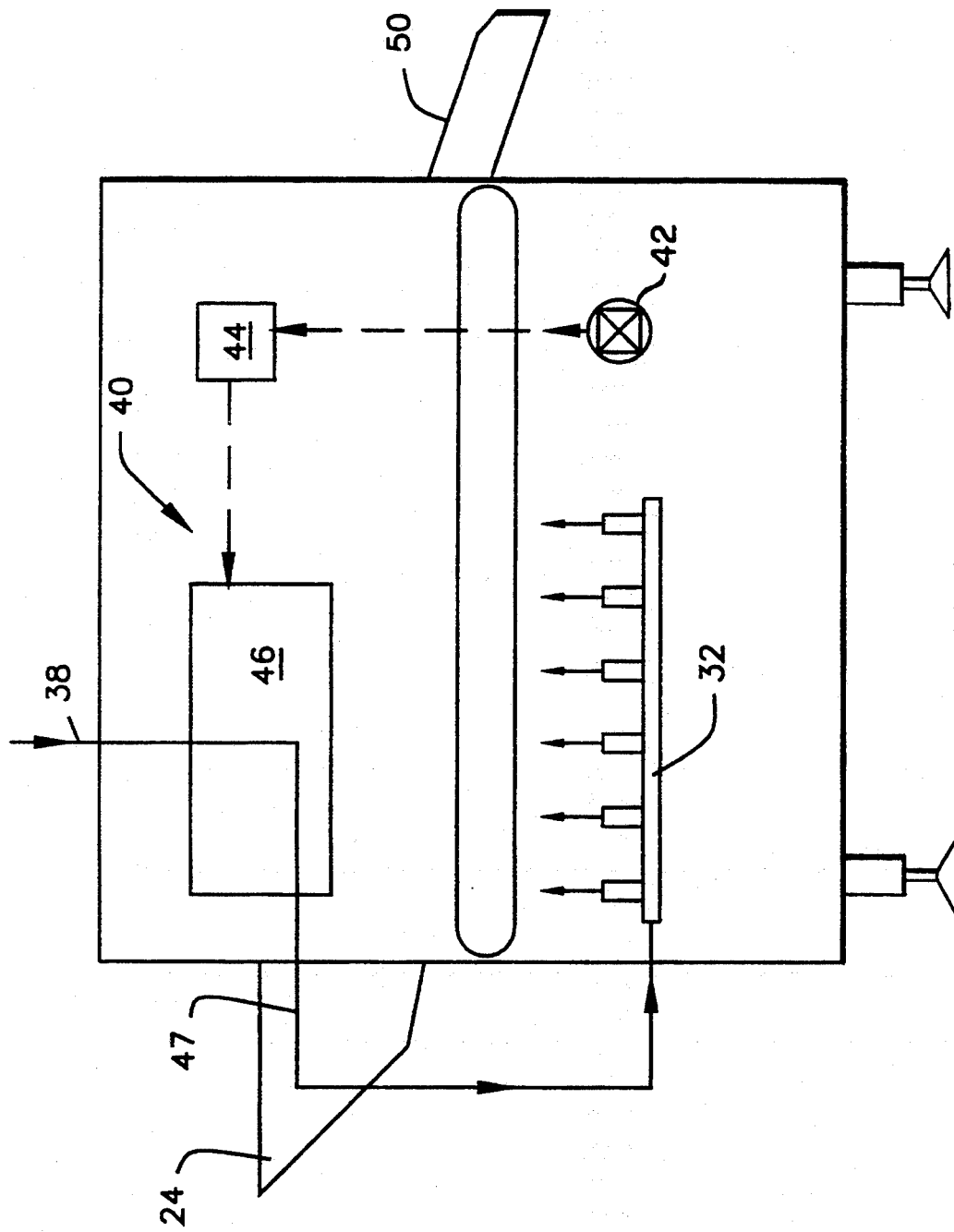
FIG. 3 is a schematic view in side elevation of a freezer showing a temperature control system for maintaining the harvested plants at a desirable temperature.

Referring to FIG. 3, the temperature control system 40 includes a temperature sensor 42, such as an Omega model NB2 CP55-18G-15, type T thermocouple and a temperature controller 44 such as a Honeywell Model UDC 3000. The temperature sensor 42 generates a millivolt signal corresponding to the temperature in the freezer 8. The signal, caused by the change in the resistance in the temperature sensor 42 between two dissimilar metals is sent to the temperature controller 44 which is provided with a preselected set point temperature.

The temperature controller 44 analyzes the variance between the set point temperature and the actual temperature, and generates an electrical signal corresponding to the detected difference between the set point and actual temperatures and transmits the signal to a control manifold 46. The control manifold 46 contains a valve (not shown) which controls the flow of the cryogen from the source 10 (see FIG. 2) through the conduit 38 into the conduit 47 and into the nozzle 32.

For example, when the freezer temperature falls below a preselected set temperature (e.g. $-45°$ F.), the new, lower temperature (e.g. $-50°$ F.) is detected by the temperature sensor 42 which sends a signal to the controller 44 where the difference between the set point temperature (e.g. $-45°$ F.) and the actual temperature (e.g. $-50°$ F.) is detected and a corresponding signal generated. This signal is sent to the control manifold 46 which adjusts the control valve contained therein until the freezer temperature is adjusted to the set temperature (e.g. raised from $-50°$ F. to $-45°$ F.). Injection of the liquid cryogen through the nozzle 32 results in instantaneous vaporization of the cryogen. The cold vapor is circulated through the freezer through the use of standard recirculating blowers (not shown) so that uniform cooling takes place.

The cooled plants and at least some of the cold vapor are passed out of an exit 48 of the freezer 8 into a duct 50. The duct 50 is preferably enclosed so as to keep the cold vapor within the duct and to intermix of the cold vapor and the cooled plants. An example of a suitable duct 50 for this purpose is a medium duty, rubber-lined duct (MacMaster-Carr model number 5502K65).

The duct 50 is of sufficient length so that it extends from the freezer 8 to the storage vessel (e.g. transportation vehicle) 12 to enable the cold vapor and cooled plants to move together, preferably by gravity, to the storage vessel 12 through an opening 52 as shown in FIG. 2. In this embodiment of the invention, the duct 50 is at a higher elevation than the storage vessel 12. Alternatively, a conveyor belt (not shown, such as a Metzgar Inclined Conveyor, model #701C2418101) modified to enclose the area above the conveyor to keep the cold vapor therein, may be used.

Once the cooled plants and cold vapor are discharged into the storage vessel 12, the same should be enclosed to keep the cold vapor therein. For example, if a transportation vehicle is employed as the storage vessel, the top of the vehicle (or other opening) for receiving the cooled plants can be covered with a tarpaulin or other suitable covering. Once in the storage vessel, the cooled plants are typically maintained within the storage vessel 12 at no more than $60°$ F. to ensure a rate of respiration at an acceptable level. It is preferred to have the storage vessel insulated to maintain the cooled atmosphere therein. This is particularly applicable when the plants leave the freezer 8 in a frozen condition to minimize too rapid loss of cooling from the storage vessel.

The cryogen is supplied to the system of the present invention from a permanent or mobile installation. In the latter embodiment, the cryogenic source 10 can be positioned on a mobile platform such as a flatbed truck 54. The cryogen (e.g. liquid nitrogen) may then be conveyed through a disengageable flexible hose 39 from the source of cryogen 10 to the insulated conduit 38.

The present invention may also be provided with a system 60 such as a Tel-Tank telemetry system employing Air-ware software (Airco Industrial Gases, Murray Hill, N.J.) to automatically monitor the system voltage as well as, for example, the flow rates, temperatures, pressures and the tank level of the cryogen source 10 and a fuel source.

Electrical power is provided to the system 2 by a generator/motor 62 (e.g. a Dayton 35KW diesel generator, model #4W121). The generator/motor 62 is powered by an engine (not shown), for example a Mazda 3.0 liter diesel engine, using fuel from a fuel tank 64 supplied through a pipeline 66.

In accordance with a preferred embodiment of the invention, the system 2 may be provided with a washing system 68 comprised of a washing fluid storage tank 70, such as a polyethylene tank (MacMaster-Carr model #3664K11). The washing tank 70 is connected to a pressure washer 72 such as a Dayton model #4Z426 which is adapted to spray a washing fluid (e.g. water) under pressure to clean the equipment after use through various conduits (not shown).

In a preferred embodiment of the invention all of the components of the system 2 may be mounted on a permanent platform or as shown particularly in FIG. 2, on one or more standard flatbed trailers 54. The trailers 54 are employed when it is desired to provide mobility to the system 2. When moving from one site to another, the system power is turned off, the flexible hose between the source of cryogen and the trailers are disconnected and the two common highway tractors are hitched to the trailers for transportation to the next site.

In accordance with the present invention, any cryogenic fluid may be used for cooling. Liquid nitrogen and carbon dioxide are preferred. However, mechanical refrigeration cold air or a combination of mechanical refrigeration and a cryogenic fluid source may be used.

What we claim is:

1. A system for chilling harvested foodstuffs at a harvest field site comprising:
   (a) transportation means for transporting the harvested foodstuffs from a harvester to a chilling means;
   (b) chilling means for reducing the temperature of the harvested foodstuffs comprising chilled fluid supply means for supplying a chilled fluid to the foodstuffs, and temperature control means for maintaining said chilling means at a temperature sufficient to reduce the rate of respiration of the foodstuffs passing therethrough; and
   (c) conveying means for conveying the chilled foodstuffs and at least a portion of the chilled fluid out of the chilling means.

2. The system of claim 1 further comprising storage means for receiving the cooled plants and said portion of the cooled fluid.

3. The system of claim 2 wherein the storage means comprises a transportation vehicle.

4. The system of claim 1 further comprising a source of cooled fluid connected to the cooled fluid supply means.

5. The system of claim 4 wherein the cooling means, source of cooled fluid and the conveying means are mounted on a transportation vehicle so that said system can be transported from one harvest field site to another.

6. The system of claim 1 wherein the cooling means is capable of freezing the harvested plants.

7. The system of claim 1 further comprising moisture removing means for removing at least a portion of the moisture contained with the harvested plants.

8. The system of claim 7 wherein the moisture removing means removes moisture before the harvested plants enter the cooling means.

9. The system of claim 1 wherein the transportation means comprises a hopper having a conveyor belt associated therewith, said hopper adapted to receive the harvested plants from harvester and said conveyor belt adapted to collect the harvested plants contained within the hopper and transport the harvested plants to the cooling means.

10. The system of claim 1 wherein the cooling means comprises a freezer, a conduit for receiving the cooled fluid, a conveyor for transporting the plants through the freezer and a nozzle for receiving the cooled fluid from the conduit and injecting the cooled fluid into the freezer so that it flows in the path of the conveyor.

11. The system of claim 1 wherein the cooled fluid is a liquid cryogen.

12. The system of claim 10 wherein the conveyor means comprises an enclosed duct extending downwardly from the freezer to the storage means.

13. A process for cooling plants at a harvest field site comprising:
    (a) transporting plants which have been harvested from a harvester to a cooling means;
    (b) reducing and controlling the temperature of the harvested plants within the cooling means with a cooled fluid to a temperature sufficient to reduce the rate of respiration or transpiration or both of the plants; and
    (c) conveying the cooled plants and at least a portion of the cooled fluid out of the cooling means to a storage means.

14. The process of claim 13 wherein the storage means comprises a transportation vehicle.

15. The process of claim 13 wherein the step of transporting the plants to a cooling means comprises collecting the harvested plants on a conveyor connected to the cooling means and conveying the harvested plants to the cooling means on the conveyor.

16. The process of claim 13 comprising freezing the harvested plants.

17. The process of claim 13 further comprising removing at least a portion of the moisture from the harvested plants.

18. The process of claim 17 comprising removing moisture from the harvested plants before the temperature of the harvested plants is reduced in the cooling means.

19. The process of claim 13 comprising transporting the harvested plants through a freezer and injecting the cooled fluid into the freezer to thereby cool the plants being transported therethrough.

20. The process of claim 19 wherein the cooled fluid is a liquid cryogen.

21. The process of claim 13 wherein step (c) comprises conveying the cooled plants and said portion of cooled fluid from the cooling means through an enclosed conduit to said storage means.

22. The process of claim 13 wherein steps (a) through (c) are carried out on a mobile platform.

23. The process of claim 19 wherein the injected cooled fluid forms a vapor which is recirculated, said process comprising injecting the cooled fluid in combination with the recirculated vapor at a velocity sufficient to support the weight of the plants as conveyed through the cooling means.

* * * * *